United States Patent
Chu et al.

(10) Patent No.: US 10,374,510 B2
(45) Date of Patent: Aug. 6, 2019

(54) COMPENSATED ACTIVE ELECTRO-MAGNETIC INTERFERENCE FILTERS

(71) Applicant: TEXAS INSTRUMENTS INCORPORATED, Dallas, TX (US)

(72) Inventors: Yongbin Chu, Plano, TX (US); Jeffrey Anthony Morroni, Parker, TX (US); Yogesh Kumar Ramadass, San Jose, CA (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 0 days.

(21) Appl. No.: 15/715,975

(22) Filed: Sep. 26, 2017

(65) Prior Publication Data
US 2018/0295758 A1    Oct. 11, 2018

Related U.S. Application Data

(60) Provisional application No. 62/482,799, filed on Apr. 7, 2017.

(51) Int. Cl.
*H02M 1/44*    (2007.01)
*H02M 1/12*    (2006.01)

(52) U.S. Cl.
CPC .............. *H02M 1/44* (2013.01); *H02M 1/12* (2013.01)

(58) Field of Classification Search
CPC ....... H02M 1/12; H02M 2001/12; H02M 1/44
See application file for complete search history.

(56) References Cited

U.S. PATENT DOCUMENTS

| | | |
|---|---|---|
| 4,667,279 A | 5/1987 | Maier |
| 5,450,622 A | 9/1995 | Vandegraaf |
| 5,452,086 A | 9/1995 | Bunn |
| 5,614,828 A * | 3/1997 | Sims ............. F02P 17/08 324/402 |
| 5,732,143 A | 3/1998 | Andrea et al. |
| 6,208,134 B1 | 3/2001 | Demma |
| 6,292,501 B1 | 9/2001 | DuBose |
| 7,856,289 B2 | 12/2010 | Schanin et al. |
| 8,704,074 B1 | 4/2014 | Liu |
| 9,671,469 B2 | 6/2017 | Koduka et al. |
| 9,705,465 B2 | 7/2017 | Bodnar et al. |
| 9,722,484 B2 | 8/2017 | Stahl et al. |
| 9,726,775 B2 | 8/2017 | Lamesch |

(Continued)

*Primary Examiner* — Kyle J Moody
(74) *Attorney, Agent, or Firm* — Michael A. Davis, Jr.; Charles A. Brill; Frank D. Cimino

(57) ABSTRACT

An active electromagnetic interference (EMI) filter includes an amplifier configured to sense noise signals on a power conductor, and drive a cancellation signal onto the power conductor. The cancellation signal is to reduce the amplitude of the noise signals. Some embodiments of the active EMI filter include a high frequency compensation network that improves the high frequency phase margin of the active EMI filter and improves the stability of the active EMI filter at high frequencies. Some embodiments of the active EMI filter include a low frequency compensation capacitor that increases the phase margin of the active EMI filter at low frequencies. Some embodiments of the active EMI filter include low frequency compensation circuitry that increases the low frequency tolerance of the active EMI filter.

18 Claims, 4 Drawing Sheets

(56) References Cited

U.S. PATENT DOCUMENTS

| | | |
|---|---|---|
| 9,733,275 B2 | 8/2017 | Deliwala et al. |
| 9,734,814 B2 | 8/2017 | Christoph et al. |
| 9,755,519 B1 | 9/2017 | Huang |
| 9,880,574 B2 | 1/2018 | Morroni |
| 2002/0020225 A1 | 2/2002 | Sakai et al. |
| 2002/0105233 A1* | 8/2002 | Vice .................. H02J 3/01 307/105 |
| 2004/0008527 A1 | 1/2004 | Honda |
| 2006/0280314 A1 | 12/2006 | Okada et al. |
| 2008/0278229 A1 | 11/2008 | Grundl et al. |
| 2010/0142718 A1 | 6/2010 | Chin et al. |
| 2013/0027011 A1 | 1/2013 | Shih et al. |
| 2013/0328627 A1 | 12/2013 | Krohn |
| 2014/0071719 A1 | 3/2014 | Stahl et al. |
| 2014/0292401 A1 | 10/2014 | Shen |
| 2015/0061769 A1 | 3/2015 | Bodnar et al. |
| 2015/0130436 A1 | 5/2015 | Kanamori |
| 2015/0145801 A1 | 5/2015 | Angelini et al. |
| 2015/0249457 A1 | 9/2015 | Miyake |
| 2015/0263614 A1 | 9/2015 | Bansal et al. |
| 2015/0333712 A1 | 11/2015 | Deliwala et al. |
| 2016/0025777 A1 | 1/2016 | Deliwala et al. |
| 2016/0187386 A1* | 6/2016 | El-Damak .......... G01R 19/0092 324/126 |
| 2016/0259353 A1 | 9/2016 | Morroni |
| 2017/0153161 A1 | 6/2017 | Yomoyama |
| 2017/0345407 A1 | 11/2017 | Christoph et al. |

\* cited by examiner

COMPENSATED ACTIVE ELECTRO-MAGNETIC INTERFERENCE FILTERS

CROSS-REFERENCE TO RELATED APPLICATIONS

The present application claims priority to U.S. Provisional Patent Application No. 62/482,799, filed Apr. 7, 2017, entitled "Compensation of Voltage Sense and Current Cancellation (VSCC) Active EMI Filter (AEF)," which is hereby incorporated herein by reference in its entirety for all purposes.

BACKGROUND

Switching power converters produce electromagnetic interference (EMI) at the converter switching frequency and harmonics thereof. The EMI may be injected onto conductors connecting the switching power converter to a power source, such as a battery, and affect other devices connected by the power source. To reduce the effects of EMI, an EMI filter may be connected to the power inputs of the switching power converter.

Passive and active type EMI filters are implemented in various applications. Passive EMI filters employ only passive components and can be large and expensive. Active EMI filters employ active components, and can be smaller and more cost effective than passive EMI filters.

SUMMARY

Compensated active electromagnetic interference (EMI) filters that provide a substantial performance improvement over conventional active EMI filters are disclosed herein. In one embodiment, an active electromagnetic interference filter includes an amplifier and a high frequency compensation network. The amplifier is configured to sense noise signals on a power conductor, and drive a cancellation signal onto the power conductor. The cancellation signal is to reduce the amplitude of the noise signals. The high frequency compensation network is connected to the power conductor and to a reference conductor. The high frequency compensation network includes a capacitor and a resistor. The first capacitor and the first resistor are connected in series across the power conductor and the reference conductor.

In another embodiment, an active EMI filter includes an amplifier, a first injection capacitor, a second injection capacitor, a first sense capacitor, a second sense capacitor, and a compensation capacitor. The amplifier is configured to sense noise signals on a power conductor, and to drive a cancellation signal onto the power conductor. The cancellation signal is to reduce the amplitude of the noise signals. The first sense capacitor is in series with the second sense capacitor. A first terminal of the first sense capacitor is connected to the power conductor. A first terminal of the second sense capacitor is connected to an inverting input of the amplifier. A second terminal of the first sense capacitor is connected to a second terminal of the second sense capacitor. The first injection capacitor is in series with the second injection capacitor. A first terminal of the first injection capacitor is connected to the power conductor. A first terminal of the second injection capacitor is connected to an output of the amplifier. A second terminal of the first injection capacitor is connected to a second terminal of the second injection capacitor. The compensation capacitor is connected between the sensing capacitor branch and injection capacitor branch. A first terminal of the compensation capacitor is connected to the second terminal of the first sense capacitor. A second terminal of the compensation capacitor is connected to the second terminal of the first injection capacitor.

In a further embodiment, an active EMI filter includes an amplifier, a resistor, and a low frequency compensation capacitor. The amplifier is configured to sense noise signals on a power conductor, and to drive a cancellation signal onto the power conductor. The cancellation signal is to reduce the amplitude of the noise signals. The resistor is connected to provide feedback from an output of the amplifier to an inverting input of the amplifier. The low frequency compensation capacitor is connected to provide feedback from the output of the amplifier to the inverting input of the amplifier.

BRIEF DESCRIPTION OF THE DRAWINGS

For a detailed description of various examples, reference will now be made to the accompanying drawings in which.

DETAILED DESCRIPTION

Certain terms are used throughout the following description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections. The recitation "based on" is intended to mean "based at least in part on." Therefore, if X is based on Y, X may be a function of Y and any number of other factors.

While conventional active electromagnetic interference (EMI) filters provide a number of advantages over passive EMI filters, conventional active EMI filters (e.g., voltage sense and current compensation active EMI filters) are subject to a variety of shortcomings. For example, conventional active EMI filters can easily become unstable at both high frequencies and low frequencies. Moreover, the amplifier in a conventional active EMI filter is easily driven into saturation by low frequency disturbances, which limits the applications for which the filter is suitable.

Embodiments of the active EMI filter of the present disclosure include compensation circuitry that improves the stability and low frequency tolerance of the filter. Embodiments include high frequency compensation circuitry that improves the stability of the filter at high frequencies, low frequency compensation circuitry that improves the stability of the filter at low frequencies, and/or low frequency compensation circuitry that improves the tolerance of the filter to low frequency disturbances. The compensation circuitry included in embodiments of the active EMI filter disclosed herein improves the stability of the filter without degrading the performance of the filter. Accordingly, embodiments of the active EMI filter disclosed herein are suitable for use in a broader array of applications than are conventional active EMI filters.

While embodiments are described herein with respect to reducing noise generated by a switch-mode power supply, such as a DC-DC converter, embodiments of the active EMI filter disclosed herein are applicable to noise suppression in a wide variety of applications, such as motor drives, class-D amplifiers, etc.

Figure 1:
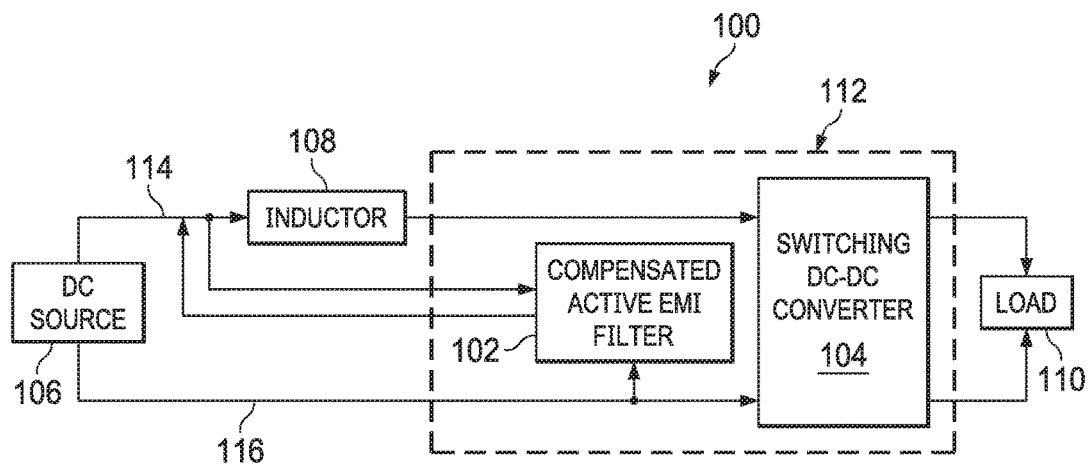
FIG. 1 shows a block diagram of a power system that includes a frequency compensated active electromagnetic interference (EMI) filter in accordance with various embodiments.

FIG. 1 shows a block diagram of a power system 100 that includes a frequency compensated active EMI filter 102 in accordance with various embodiments. The power system 100 also includes a switching DC-DC converter 104 and a DC power source 106. In various embodiments, the DC power source 106 is a battery, a fuel cell, a photovoltaic cell, a DC power supply, or other source of DC power. The switching DC-DC converter 104 converts power provided by the DC source 106 at a first voltage to a different output voltage. Power at the different output voltage is applied to a load 110, where the load 110 is any electric or electronic circuit that operates on DC power in various embodiments of the system 100. The switching DC-DC converter 104 is coupled to the DC power source 106 via an inductor 108. In some embodiments, the inductor 108 may have a value of at least one microhenry.

The switching DC-DC converter 104 is a buck converter, a boost converter, a buck-boost converter, or other type of switch mode power supply that converts a DC voltage input to a different DC output voltage. The switching DC-DC converter 104 converts one voltage to another by switching energy provided by the DC power source 106 to a storage device, such as an inductor or capacitor, and releasing the stored energy to the output of the converter 104 at a predetermined different voltage. For example, the switching DC-DC converter 104 may produce a 5 volt output from a 12 volt input. Switching in the DC-DC converter 104 generates noise on the inputs of the converter 104 and on the conductors (power conductors 114 and reference conductors 116) connecting the switching DC-DC converter 104 to the DC power source 106. The noise originating in the switching DC-DC converter 104 may propagate to other systems and devices powered by the DC power source 106 (e.g., other devices coupled to the conductors 114 and/or 116).

The compensated active EMI filter 102 is coupled to the conductors 114 and 116 connecting the switching DC-DC converter 104 to the DC power source 106. The compensated active EMI filter 102 is a voltage sense and current compensation filter that senses noise signal as voltage on the power conductors 114 connecting the inductor 108 to the DC power source 106, generates a cancellation signal based on the sensed noise voltage, and drives the cancellation signal (i.e., a current) onto the power conductors 114 to reduce the amplitude of the sensed noise voltage. In some embodiments, the compensated active EMI filter 102 and the switching DC-DC converter 104 are housed in a common package 112, e.g., a common integrated circuit, such as a power supply controller integrated circuit, or a common power supply module package. The compensated active EMI filter 102 provides enhanced high and low frequency stability, and increases the tolerance to low frequency disturbances relative to conventional active EMI filter implementations without degrading the performance of the filter. Accordingly, embodiments of the frequency compensated active EMI filter 102 are suitable for use in applications in which conventional active EMI filters would be unstable, or subject to saturation or performance degradation.

Embodiments of the compensated active EMI filter 102 may be applied in any application in which it is desirable to reduce the presence of noise on the output of the DC power source 106. For example, in automotive applications a variety of systems are powered by a battery that serves as the DC power source 106. The compensated active EMI filter 102 may be applied to reduce the incidence of switching noise generated by the switching DC-DC converter 104 on the output of the battery, thereby reducing the amplitude of noise signals propagated to other automotive systems via the conductors 114 and 116.

Figure 2:
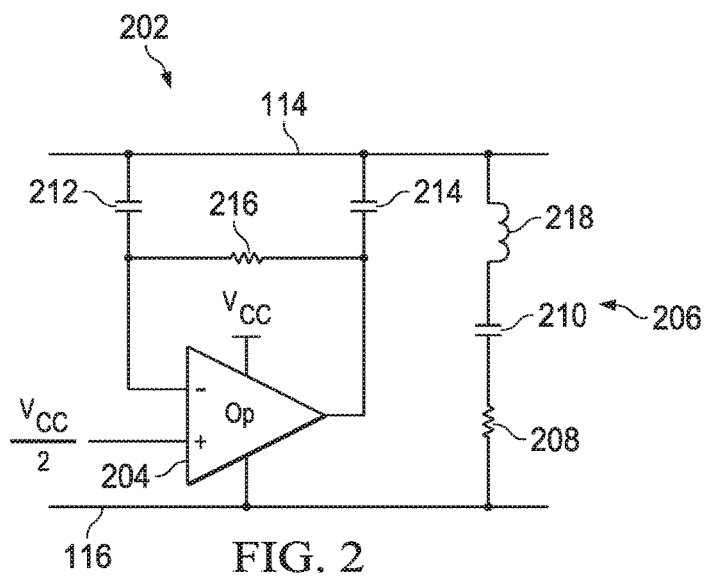
FIG. 2 shows a schematic diagram of an active EMI filter that includes high frequency compensation in accordance with various embodiments.

FIG. 2 shows a schematic diagram of an active EMI filter 202 that includes high frequency compensation in accordance with various embodiments. The active EMI filter 202 is an embodiment of the frequency compensated active EMI filter 102. The active EMI filter 202 includes an amplifier 204, a sense capacitor 212, an injection capacitor 214, a feedback resistor 216, and a high frequency compensation network 206. The amplifier 204 is implemented as an operational amplifier in some embodiments.

The amplifier 204 is AC coupled to the power conductors 114 via the sense capacitor 212 and the injection capacitor 214. The sense capacitor 212 couples an input of the amplifier 204 to the power conductors 114 to allow the amplifier 204 to detect noise signal on the power conductors 114. The injection capacitor 214 couples the output of the amplifier 204 to the power conductors 114 to allow the amplifier 204 to drive a noise cancellation signal onto the power conductors 114. In some embodiments, the sense capacitor 212 has a value in a range of 25 nanofarads to 100 nanofarads. The amplifier 204 senses noise signal (e.g., noise voltage) on the power conductors 114, and generates a cancellation signal (e.g., an inverse of the detected noise signal) to be driven onto the power conductors, via the injection capacitor 214, to reduce the amplitude of the noise signal. In some embodiments, the injection capacitor 214 has a value in a range of 50 nanofarads to 200 nanofarads.

The feedback resistor 216 is coupled to the output of the amplifier 204 and to the input of the amplifier 204 to provide a DC feedback path for amplifier 204. In some embodiments, the feedback resistor 216 has a value in a range of 1 megohm to 20 megohms.

In conventional implementations of an active EMI filter, the high frequency phase margin is inadequate to ensure that the filter is stable in various applications. Embodiments of the active EMI filter 202 include a high frequency compensation network 206 to improve the high frequency phase margin of the active EMI filter 202 and improve the stability of the active EMI filter 202 at high frequencies. The high frequency compensation network 206 includes a resistor 208 and a capacitor 210 connected in series from the power conductors 114 to the reference conductors 116 that couple the DC power source 106 to the switching DC-DC converter 104. In some embodiments, the resistor 208 has a value of less than one ohm and the capacitor 210 has a value in a range of 10 nanofarads to 1000 nanofarads. Some embodiments employ different values of resistance and capacitance. The high frequency compensation network 206 significantly increases the phase margin of the filter 202 at high frequencies (e.g., frequencies above one megahertz) to stabilize the active EMI filter 202 at high frequencies. The high frequency compensation network 206 does not negatively impact the performance of the active EMI filter 202. Some embodiments of the high frequency compensation network 206 include an inductor 218 in series with the capacitor 210 and the resistor 208.

Figure 3:
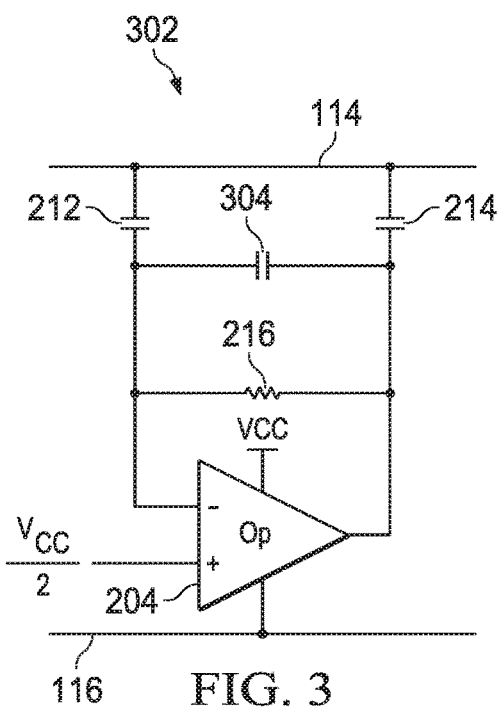
FIG. 3 shows a schematic diagram of an active EMI filter that includes low frequency compensation in accordance with various embodiments.

FIG. 3 shows a schematic diagram of an active EMI filter 302 that includes low frequency compensation in accordance with various embodiments. The active EMI filter 302 is an embodiment of the frequency compensated active EMI filter 102. The active EMI filter 302 includes an amplifier 204, a sense capacitor 212, an injection capacitor 214, a feedback resistor 216, and a low frequency compensation capacitor 304. The amplifier 204 is implemented as an operational amplifier in some embodiments.

The amplifier 204 is AC coupled to the power conductors 114 via the sense capacitor 212 and the injection capacitor 214. The sense capacitor 212 couples an input of the amplifier 204 to the power conductors 114 to allow the amplifier 204 to detect noise signal on the power conductors 114. The injection capacitor 214 couples the output of the amplifier 204 to the power conductors 114 to allow the amplifier 204 to drive a noise cancellation signal onto the power conductors 114. In some embodiments, the sense capacitor 212 has a value in a range of 25 nanofarads to 100 nanofarads. The amplifier 204 senses noise signal (e.g., noise voltage) on the power conductors 114, and generates a cancellation signal (e.g., an inverse of the detected noise signal) to be driven onto the power conductors, via the injection capacitor 214, to reduce the amplitude of the noise signal. In some embodiments, the injection capacitor 214 has a value in a range of 50 nanofarads to 200 nanofarads.

The feedback resistor 216 is coupled to the output of the amplifier 204 and to the input of the amplifier 204 to provide a DC feedback path for amplifier 204. In some embodiments, the feedback resistor 216 has a value in a range of 1 megohm to 20 megohms.

In conventional implementations of an active EMI filter, the low frequency phase margin is inadequate to ensure that the filter is stable in various applications. Embodiments of the active EMI filter 302 include the low frequency compensation capacitor 304 to improve the low frequency phase margin of the active EMI filter 302 and improve the stability of the active EMI filter 302 at low frequencies (e.g., frequencies below 100 kilohertz). The low frequency compensation capacitor 304 is coupled to an input of the amplifier 204 and to the output of the amplifier 204 to provide another feedback path for the signal at the output of the amplifier 204 to the input of the amplifier 204. In some embodiments, the low frequency compensation capacitor 304 has a value in a range of 10 picofarads to 1000 picofarads. Some embodiments employ a different value of capacitance. The low frequency compensation capacitor 304 significantly increases the phase margin of the filter 302 at low frequencies to stabilize the active EMI filter 302 at low frequencies. The low frequency compensation capacitor 304 does not negatively impact the performance of the active EMI filter 302.

Figure 4:
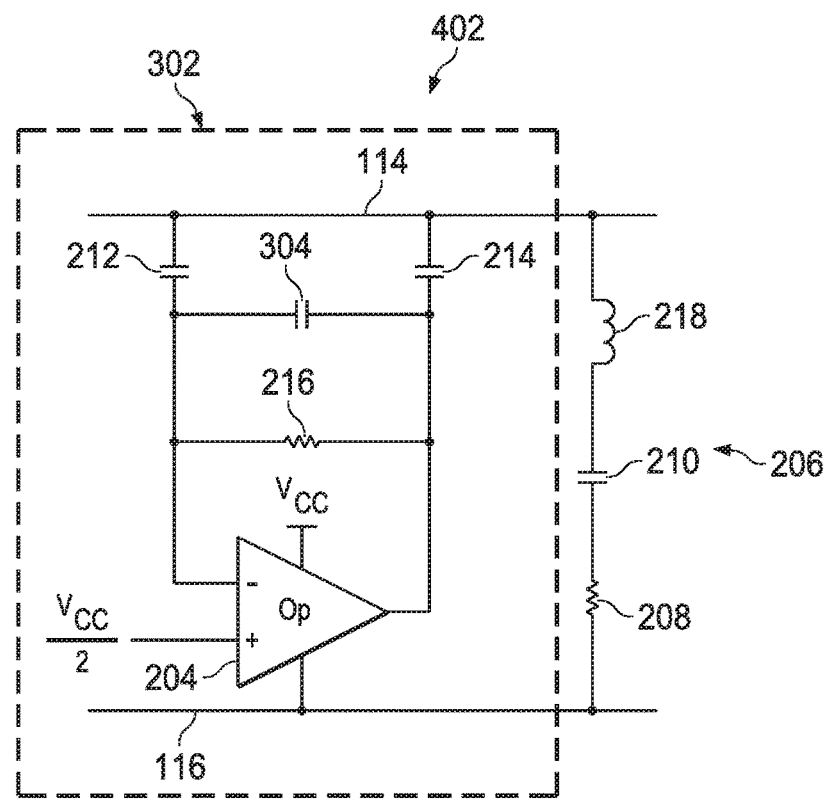
FIG. 4 shows a schematic diagram of an active EMI filter that includes low and high frequency compensation in accordance with various embodiments.

FIG. 4 shows a schematic diagram of an active EMI filter 402 that includes low and high frequency compensation in accordance with various embodiments. The active EMI filter 402 is an embodiment of the frequency compensated active EMI filter 102. The active EMI filter 402 includes the high frequency compensation network 206 and the active EMI filter 302, which includes low frequency compensation. Thus, the active EMI filter 402 provides improved stability at both low and high frequencies relative to conventional active EMI filters without negatively affecting filter performance.

Figure 5:
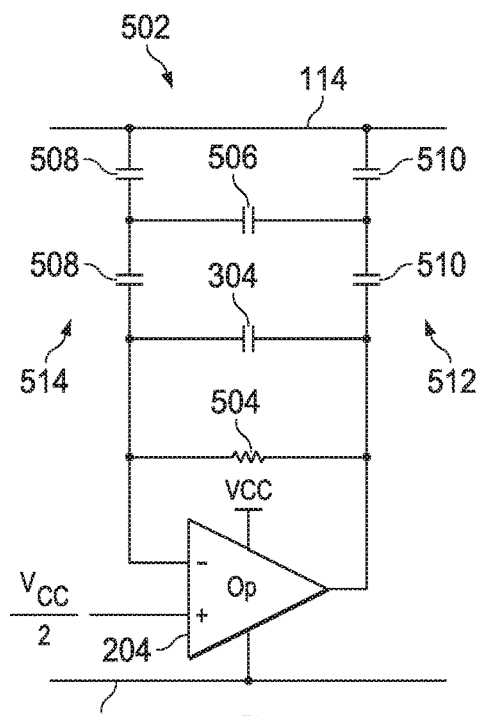
FIG. 5 shows a schematic diagram of an active EMI filter that includes low frequency compensation and improved low frequency tolerance in accordance with various embodiments.

FIG. 5 shows a schematic diagram of an active EMI filter 502 that includes low frequency compensation and improved low frequency tolerance in accordance with various embodiments. The active EMI filter 502 is an embodiment of the frequency compensated active EMI filter 102. The active EMI filter 502 includes an amplifier 204, sense capacitors 508, injection capacitors 510, a feedback resistor 504, a first low frequency compensation capacitor 304, and a second low frequency compensation capacitor 506. The amplifier 204 is implemented as an operational amplifier in some embodiments.

The amplifier 204 is AC coupled to the power conductors 114 via the sense capacitors 508 and the injection capacitors 510. The sense capacitors 508 are connected in series and couple an input of the amplifier 204 to the power conductors 114 to allow the amplifier 204 to detect noise signal on the power conductors 114. The injection capacitors 510 are connected in series and couple the output of the amplifier 204 to the power conductors 114 to allow the amplifier 204 to drive a noise cancellation signal onto the power conductors 114. In some embodiments, each sense capacitor 508 has a value in a range of 50 nanofarads to 200 nanofarads. The amplifier 204 senses noise signal (e.g., noise voltage) on the power conductors 114, and generates a cancellation signal (e.g., an inverse of the detected noise signal) to be driven onto the power conductors, via the injection capacitors 510, to reduce the amplitude of the noise signal. In some embodiments, each injection capacitor 510 has a value in a range of 100 nanofarads to 300 nanofarads.

The first low frequency compensation capacitor 304 improves the low frequency phase margin of the active EMI filter 502 and improves the stability of the active EMI filter 502 at low frequencies. The first low frequency compensation capacitor 304 is coupled to an input of the amplifier 204 and to the output of the amplifier 204 to allow feedback of signal from the output of the amplifier 204 to the input of the amplifier 204. In some embodiments, the first low frequency compensation capacitor 304 has a value in a range of 50 picofarads to 200 picofarads. Some embodiments employ a different value of capacitance for the first low frequency compensation capacitor 304.

Some embodiments of the active EMI filter have an undesirably small tolerance for low frequency signal. For example, a low frequency disturbance on the power conductors 114 may saturate the amplifier 204. Embodiments of the active EMI filter 502 include low frequency compensation that increases the low frequency tolerance of the filter, and increases the number of applications for which the filter is suitable. The feedback resistor 504 is coupled to the output and an input of amplifier 204 to provide a DC feedback path for amplifier 204. In some embodiments, to increase low frequency tolerance, the feedback resistor 504 is substantially smaller than the feedback resistor 216 of the filters 202, 302, and 402. In some embodiments of the active EMI filter 502, the feedback resistor 504 has a value of less than 100 kilohms.

To ensure stability with the smaller value of feedback resistance, the active EMI filter 502 includes the second low frequency compensation capacitor 506. The second low frequency compensation capacitor 506 is between the sensing capacitor branch 514 that includes sensing capacitors 508 and the injection capacitor branch 512 that includes injection capacitors 510. More specifically, a first terminal of the second low frequency compensation capacitor 506 is connected to the connected terminals of the sense capacitors 508, and a second terminal of the second low frequency compensation capacitor 506 is connected to the connected terminals of the injection capacitors 510. In some embodiments, the second low frequency compensation capacitor 506 has a value in a range of 1000 picofarads to 20 nanofarads. Some embodiments employ a different value of capacitance for the second low frequency compensation capacitor 506.

Figure 6:
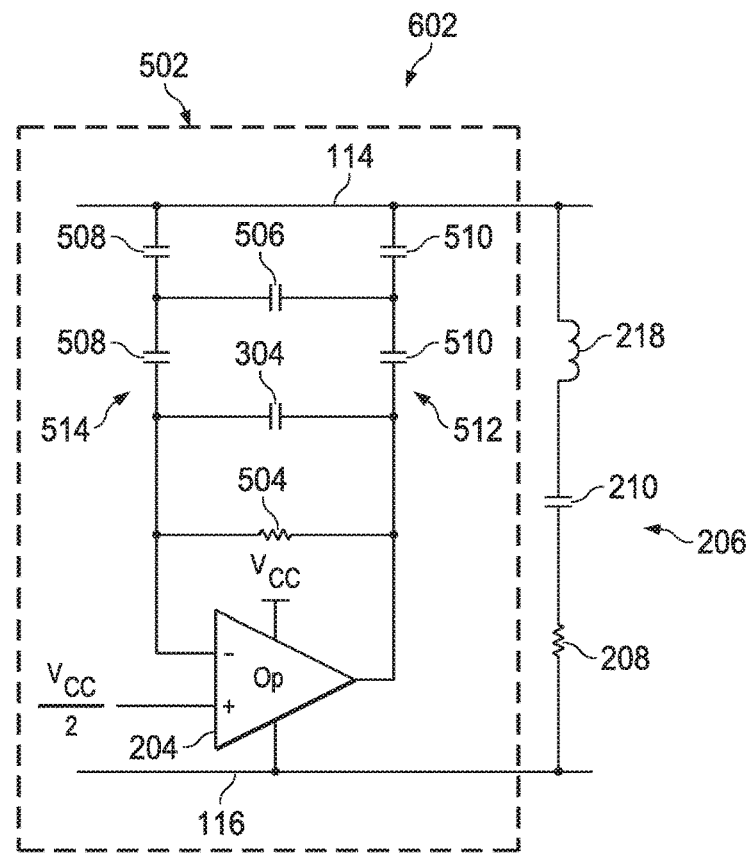
FIG. 6 shows a schematic diagram of an active EMI filter that includes high frequency compensation, low frequency compensation, and improved low frequency tolerance in accordance with various embodiments.

FIG. 6 shows a schematic diagram of an active EMI filter 602 that includes high frequency compensation, low frequency compensation, and improved low frequency tolerance in accordance with various embodiments. The active EMI filter 602 is an embodiment of the frequency compensated active EMI filter 102. The active EMI filter 602 includes the high frequency compensation network 206 and the active EMI filter 502, which includes low frequency compensation and improved low frequency tolerance. Thus, the active EMI filter 602 provides improved low frequency tolerance and improved stability at both low and high frequencies relative to conventional active EMI filters without negatively affecting filter performance.

Figure 7:
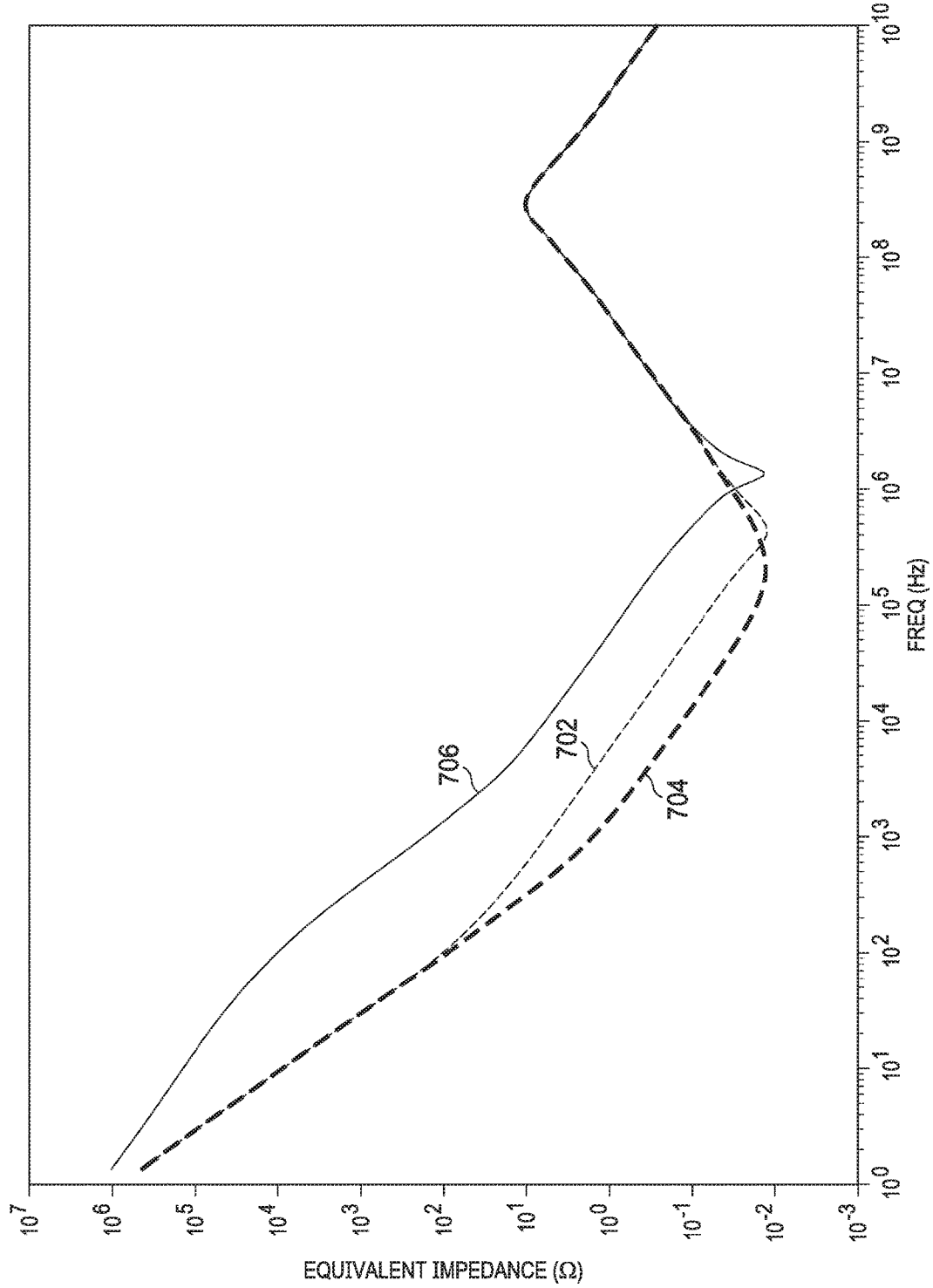
FIG. 7 shows equivalent impedance of a conventional active EMI filter, an active EMI filter with low frequency compensation, and an active EMI filter with low frequency compensation and improved low frequency tolerance in accordance with various embodiments.

FIG. 7 shows equivalent impedance 704 of a conventional active EMI filter, equivalent impedance 702 of an active EMI filter 302 with low frequency compensation, and equivalent impedance 706 of an active EMI filter 502 with low frequency compensation and improved low frequency tolerance in accordance with various embodiments. FIG. 7 shows that the compensation included in the active EMI filters 302 and 502 does not increase the equivalent impedance of the filter in the concerned frequency range for a 2 MHz automotive switcher, i.e. 2 MHz-108 MHz. Thus, relative to a conventional active EMI filter, the frequency compensated active EMI filters disclosed herein provide improved stability without sacrificing performance if compensation parameters are selected appropriately.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. An active electromagnetic interference (EMI) filter, comprising:
an amplifier having an output and an inverting input;
a frequency compensation network comprising a resistor and a capacitor, the resistor and the capacitor adapted to be coupled in series between a reference conductor and a power conductor;
a first sense capacitor having a first terminal and a second terminal, the first terminal of the first sense capacitor adapted to be coupled to the power conductor;
a second sense capacitor having a first terminal and a second terminal, the first terminal of the second sense capacitor being coupled to the inverting input of the amplifier, and the second terminal of the second sense capacitor being coupled to the second terminal of the first sense capacitor;
a first injection capacitor having a first terminal and a second terminal, the first terminal of the first injection capacitor adapted to be coupled to the power conductor; and
a second injection capacitor having a first terminal and a second terminal, the first terminal of the second injection capacitor being coupled to the output of the amplifier, and the second terminal of the second injection capacitor being coupled to the second terminal of the first injection capacitor;
the amplifier configured to sense noise signals on the power conductor and drive a cancellation signal onto the power conductor.

2. The active EMI filter of claim 1, further comprising a frequency compensation capacitor coupled between the output of the amplifier and the inverting input of the amplifier.

3. The active EMI filter of claim 2, wherein a capacitance of the frequency compensation capacitor is in a range of 10 picofarads to 1000 picofarads.

4. The active EMI filter of claim 1, further comprising a compensation capacitor having a first terminal and a second terminal, the first terminal of the compensation capacitor coupled to the second terminal of the first sense capacitor, and the second terminal of the compensation capacitor coupled to the second terminal of the first injection capacitor.

5. The active EMI filter of claim 1, wherein the resistor is a first resistor, and the active EMI filter further comprises a second resistor coupled between the output of the amplifier and the inverting input of the amplifier, a resistance of the second resistor being less than 100 kiloohms.

6. The active EMI filter of claim 1, wherein a resistance of the resistor is less than one ohm, and a capacitance of the capacitor of the frequency compensation network is in a range of 10 nanofarads to 1000 nanofarads.

7. An active electromagnetic interference (EMI) filter, comprising:
an amplifier having an output and an inverting input;
a first sense capacitor having a first terminal and a second terminal, the first terminal of the first sense capacitor adapted to be coupled to a power conductor;
a second sense capacitor having a first terminal and a second terminal, the first terminal of the second sense capacitor being coupled to the inverting input of the amplifier, and the second terminal of the second sense capacitor being coupled to the second terminal of the first sense capacitor;
a first injection capacitor having a first terminal and a second terminal, the first terminal of the first injection capacitor adapted to be coupled the power conductor;
a second injection capacitor having a first terminal and a second terminal, the first terminal of the second injection capacitor being coupled to the output of the amplifier, and the second terminal of the second injection capacitor being coupled to the second terminal of the first injection capacitor; and a compensation capacitor having a first terminal and a second terminal, the first terminal of the compensation capacitor coupled to the second terminal of the first sense capacitor, and the second terminal of the compensation capacitor coupled to the second terminal of the first injection capacitor;

the amplifier configured to sense noise signals on the power conductor and drive a cancellation signal onto the power conductor.

8. The active EMI filter of claim 7, further comprising a frequency compensation network comprising a resistor and a capacitor, the resistor and the capacitor adapted to be coupled in series between a reference conductor and the power conductor.

9. The active EMI filter of claim 8, wherein a resistance of the resistor is less than one ohm, and a capacitance of the capacitor of the frequency compensation network is in a range of 10 nanofarads to 1000 nanofarads.

10. The active EMI filter of claim 7, further comprising a frequency compensation capacitor coupled between the output of the amplifier and the inverting input of the amplifier.

11. The active EMI filter of claim 10, wherein a capacitance of the frequency compensation capacitor is in a range of 10 picofarads to 1000 picofarads.

12. The active EMI filter of claim 7, further comprising a resistor coupled between the output of the amplifier and the inverting input of the amplifier, a resistance of the resistor being less than 100 kiloohms.

13. An active electromagnetic interference (EMI) filter, comprising:
an amplifier having an output and an inverting input;
a resistor coupled between the output of the amplifier and the inverting input of the amplifier;
a frequency compensation capacitor coupled between the output of the amplifier and the inverting input of the amplifier;
a first sense capacitor having a first terminal and a second terminal, the first terminal of the first sense capacitor adapted to be coupled to a power conductor;
a second sense capacitor having a first terminal and a second terminal, the first terminal of the second sense capacitor being coupled to the inverting input of the amplifier, and the second terminal of the second sense capacitor being coupled to the second terminal of the first sense capacitor;
a first injection capacitor having a first terminal and a second terminal, the first terminal of the first injection capacitor adapted to be coupled to the power conductor; and
a second injection capacitor having a first terminal and a second terminal, the first terminal of the second injection capacitor being coupled to the output of the amplifier, and the second terminal of the second injection capacitor being coupled to the second terminal of the first injection capacitor;
the amplifier configured to sense noise signals on the power conductor and drive a cancellation signal onto the power conductor.

14. The active EMI filter of claim 13, wherein a capacitance of the frequency compensation capacitor is in a range of 10 picofarads to 1000 picofarads.

15. The active EMI filter of claim 13, wherein the frequency compensation capacitor is a first frequency compensation capacitor, and the active EMI filter further comprises a second frequency compensation capacitor having a first terminal and a second terminal, the first terminal of the second frequency compensation capacitor coupled to the second terminal of the first sense capacitor, and the second terminal of the second frequency compensation capacitor coupled to the second terminal of the first injection capacitor.

16. The active EMI filter of claim 13, wherein a resistance of the resistor is less than 100 kiloohms.

17. The active EMI filter of claim 13, wherein the resistor is a first resistor, the frequency compensation capacitor is a first frequency compensation capacitor, and the active EMI filter further comprises a frequency compensation network comprising a second resistor and a second frequency compensation capacitor, the second resistor and the second frequency compensation capacitor adapted to be coupled in series between a reference conductor and the power conductor.

18. The active EMI filter of claim 17, wherein a resistance of the second resistor is less than one ohm, and a capacitance of the second frequency compensation capacitor is in a range of 10 nanofarads to 1000 nanofarads.

* * * * *